United States Patent Office 3,395,171
Patented July 30, 1968

3,395,171
PROCESS FOR PREPARING HEXADECAHEDRAL DECABORANE DERIVATIVES AND RESULTING PRODUCTS
William C. Drinkard, Jr., Wilmington, Del., assignor to E. I. du Pont de Nemours and Company, Wilmington, Del., a corporation of Delaware
No Drawing. Continuation-in-part of application Ser. No. 220,909, Aug. 31, 1962. This application June 30, 1965, Ser. No. 468,565
12 Claims. (Cl. 260—462)

ABSTRACT OF THE DISCLOSURE

A process for preparing derivatives of hexadecahedral decaborane by reacting an acid hydrate of hexadecahedral decaborane [$H_2B_{10}H_{10} \cdot nH_2O$] with an epoxide having the structural formula,

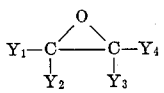

wherein $Y_1$, $Y_2$, $Y_3$ and $Y_4$ are hydrogen or monovalent radicals which are either monomeric or polymeric in character. The product is conveniently recovered by precipitation as an insoluble salt; for example, the cesium salt, [$Cs_2B_{10}H_8(OR)_2$]. The hexadecahedral decaborane derivatives are useful as detergents and as pigments or dyes.

---

This is a continuation-in-part of application Ser. No. 220,909, filed Aug. 31, 1962 and now abandoned.

This invention relates to a process for preparing derivatives of hexadecahedral decaborane and to compounds containing a hexadecahedral decaborane structural unit.

Molecules containing ten boron atoms (decaboranes) can be made with two structural arrangements; the recently discovered hexadecahedral (16 sides) decaborane anion ($B_{10}H_{14}$)$^{-2}$ and the well known cup shaped decaborane $B_{10}H_{14}$. A description of the cup shaped decaborane can be found in Gould, Inorganic Reactions and Structure 130 (Revised edition 1962, Holt Rinehart and Winston Inc.). The structural arrangement of the hexadecahedral decaborane anion is analogous to two square-based pyramids having their bases spaced apart and facing each other with one base rotated 45° relative to the other; each corner of each base is a boron atom and each boron atom is connected by a bond to the two adjacent boron atoms of its base, the boron atom at the apex of its pyramid and the two closest boron atoms of the facing base. A hydrogen atom is attached externally to each boron in this symmetrical arrangement and the total structure carries an electric charge equivalent to two electrons.

The similarity between the hexadecahedral and the cup shaped decaborane molecules ends with the fact that they contain the same number of boron atoms. In addition to the structural differences described above, their elemental makeup differs by the presence of four additional hydrogens in the cup shaped decaborane molecule. With respect to property differences the cup shaped decaborane decomposes in water to form weak boric acid (pH about 5) and derivatives of cup shaped decaborane usually are active reducing agents for many metallic ions, do not form ions and are generally unstable. In contrast the hexadecahedral decaborane anion is stable in the presence of acid and in combination with hydrogen ions forms a strong acid hydrate having the formula $H_2B_{10}H_{10} \cdot nH_2O$ (pH about 2) and derivatives of hexadecahedral decaborane by virtue of the presence of the decaborane alone are not reducing agents but form salts with metallic and other cations, form strongly charged substituted ions in aqueous solutions some of which have detergency and coloring properties, and are generally stable.

Derivatives of cup shaped decaboranes have been prepared by reaction with monooxyacycloalkanes in solutions of the monooxyacycloalkane. This reaction occurs at very slow rates, requiring as long as four weeks for oxolanes and twenty hours for oxetanes at room temperature.

In the present invention a process for preparing derivatives of hexadecahedral decaborane is provided which is more rapid and economical than the processes currently used to make derivatives of cup shaped decaboranes. This process comprises reacting an acid hydrate of hexadecahedral decaborane [$H_2B_{10}H_{10} \cdot nH_2O$] with an epoxide having the structural formula

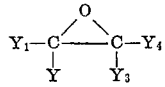

It is thought that in this reaction one of the C—O bonds of said epoxide is ruptured and the oxygen atom freed by the ruptured bond attaches to a boron atom of the decaborane. In the epoxide each of $Y_1$, $Y_2$, $Y_3$ and $Y_4$ is hydrogen or a monovalent radical. Any epoxide which will react with benzene in the presence of aluminum chloride (catalyst) at a temperature less than about 100° C. to form a substituted benzene of the type

⬡—OR where OR corresponds to the epoxide utilized with the epoxy ring opened is useful in this invention.

By conducting the reaction of this invention in a solution of the acid hydrate and regulating the temperature to provide a controlled reaction rate, high yields of substituted hexadecahedral decaborane anions are produced. These substituted anions have the formula $$[B_{10}H_8(OR)_2]^{-2}$$

where —OR corresponds to the epoxide utilized with the epoxy ring opened to form a monovalent —OR radical which is bonded to a boron in the decaborane through the oxygen. The product is conveniently recovered by precipitation as an insoluble salt, for example, the cesium salt [$Cs_2B_{10}H_8(OR)_2$]. By varying the relative quantity of epoxide employed, other similar anions containing ether-like functions can be obtained having the general formula [$B_{10}H_{10-y}(OR)_y$]$^{-2}$ where $y$ is a whole number from 1 to 4 preferably, and permissibly 5–10 inclusive.

The substituted decaborane compounds of this invention can have electrical charges arising from the nature of the R groups in addition to the charge associated with the hexadecahedral decaborane. For example, R may bear carboxyl groups which, in ionic form, require the presence of a cation. As a further illustration, R may bear basic groups, e.g., $NH_2$, which will form ionizable salts with acids. Cations and anions derived from R groups are considered to be part of these groups and are included within the scope of the definition of R.

Solutions of the acid hydrate of hexadecahedral decaborane useful in carrying out the reaction of this invention can be in the form of an aqueous syrup in which water and the acid hydrate are present in about equal amounts by weight. However, no water is necessary for the present process beyond that required to permit the hexadecahedral decaborane anion to be in its acidic form.

In a preferred procedure this aqueous syrup is mixed with a solvent such as glyme (ethylenegylcoldimethylether) to form a solution, and an epoxide in fluid form (i.e., this may be a liquid epoxide, or a solid epoxide in solution) is added slowly (usually dropwise) while maintaining the temperature of the reaction mixture in the range of about 10° C. to about 30° C. The reaction is practically instantaneous and is controlled by the rate of addition of the epoxide and by regulating the solution temperature. With very highly reactive epoxides, temperature of 0° C. and even lower may be necessary for reaction rate control whereas temperatures about 30° C. may be used to increase the reaction rate of relatively sluggish epoxides. Untried epoxides should be handled by starting the reaction at a low temperature and gradually warming the reaction mixture until the desired reaction rate is achieved. The reaction product is readily recovered by precipitation as an insoluble salt but any convenient recovery procedure such as extraction, distillation and the like can be used. Cesium in the form of CsF and CsOH is preferred as the precipitating agent.

Both liquid and solid epoxides can be utilized in this invention. Solid epoxides are conveniently dissolved in a solvent miscible with the acid hydrate solution to be used in order to facilitate contact between the reactants. Usually both reactants can be dissolved in glyme which is accordingly a preferred solvent for practicing this invention. Other useful solvents include esters such as methyl acrylate and butyl propionate; dioxane and nitriles such as acetonitrile and benzonitrile. Preferably the solvent used is one in which the acid hydrate dissolves readily and is miscible with water. Most desirably the solvent should also permit recovery of the product by a convenient method.

Epoxides having two or more oxirane groups can also be used in the process of this invention. In these epoxides the oxirane groups can be vicinal or can be separated by one or more intervening atoms. Useful epoxides can be mono- or polyfunctional, cyclic or acyclic. Polymeric products are obtainable by using appropriate epoxides, that is, epoxides with polymer forming functional groups or epoxides which are already polymers containing one or more epoxy groups. Epoxides containing ethylenic unsaturation sometimes react with the acid hydrate of hexadecahedral decarborane to produce compounds in which —OR, the epoxide compound moiety, is saturated. Otherwise the orangic portion of the reaction product usually corersponds to the epoxide reagent used, the epoxy group simply opening up and attaching to a boron of the hexadecahedral decaborane by an ether-like linkage.

In the epoxides useful in this invention $Y_1$, $Y_2$, $Y_3$ and $Y_4$ can be the same or different from each other and can be hydrogen or a radical such as an aromatic, aliphatic or alicyclic group or a heterocyclic group or can be a functional group such as one of the functional groups listed below or one of the above-mentioned groups substituted with one or more of the following functional groups:

$$-\overset{O}{\underset{\|}{C}}-A \quad -C=CH_2 \quad -\overset{S}{\underset{\|}{C}}-NA_2$$

$$-\overset{O}{\underset{\|}{C}}-OA \quad -C=CH- \quad -\overset{O}{\underset{\|}{S}}-A$$

$$-\overset{O}{\underset{\|}{C}}-NA_2 \quad -C\equiv C- \quad -\overset{O}{\underset{\|}{\underset{\|}{S}}}-A \\ \overset{}{\underset{O}{}}$$

$$-CN \quad -\overset{O}{\underset{\|}{C}}-H \quad -SSA$$

$$-X(Cl, F, Br) \quad -NO_2 \quad -N\overset{}{H}\overset{O}{\underset{\|}{C}}-OA$$

$$-NA_2 \quad -\overset{O}{\underset{\|}{P}}-(OA)_2 \quad -NCS$$

$$-SA \quad -OH \quad -NC$$

In the above groups A is a monovalent organic radical preferably hydrocarbon, of up to about 15 carbons, which can be alkyl, alkenyl, cycloalkyl, cycloalkenyl, aryl, alkaryl, aralkyl and the like. Any of $Y_1$, $Y_2$, $Y_3$ and $Y_4$ may contain one or more epoxy groups and any two or more of $Y_1$, $Y_2$, $Y_3$ and $Y_4$ can in combination represent an alicyclic or heterocyclic group.

Epoxides preferred for use in this invention are those having the structural formula

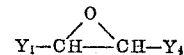

in which $Y_1$ and $Y_4$ have the meaning set forth above and in which $Y_1$ and $Y_4$ are functional groups such as those listed above or radicals containing such functional groups. Such epoxides in which the functional groups are polymer forming are particularly preferred. The polymer forming groups can be capable of forming addition polymers or condensation polymers. Following reaction of epoxides containing polymer forming groups with the acid hydrate of hexadecahedral decaborane the polymer can be produced by a conventional reaction.

Polymers containing the hexadecahedral decaborane unit can also be prepared by the process of the present invention by employing a polymer containing an epoxy group, that is, an epoxide of the above structural Formula 1 in which one or more of $Y_1$, $Y_2$, $Y_3$ or $Y_4$ is a polymer radical, that is, a radical formed by removing hydrogen from a polymer. The polymer can be an addition or a condensation polymer and is preferably a linear polymer. Polyamides, polyesters and polyureas are preferred condensation polymers, being very useful for the formation of fibers and films, coatings, finishes and insulation in applications where the presence of the decaborane anion is desirable.

The polymers of this invention contain a $B_{10}$ group having a hexadecahedral structure, usually as a component of each recurring unit. This group can be in the polymer backbone or in a pendant group. Thus, typical addition polymers have the recurring unit

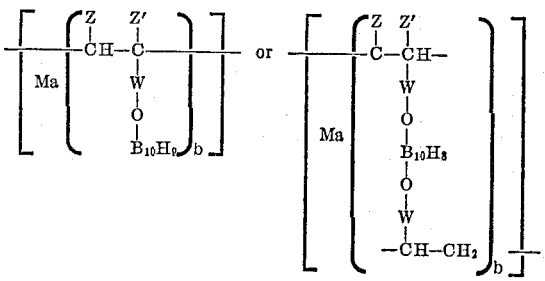

where W is a divalent organic radical containing an alkylene group attached to the oxygen in the formula, M, $a$ and $b$ are as defined below, and Z and/or Z′ is hydrogen or a monovalent radical such as —CN, —COOH, —OH, halogen or hydrocarbon such as $C_1$ to $C_{14}$ alkyl, $C_2$ to $C_{14}$ alkenyl, or $C_6$ to $C_{14}$ aryl. Typical polymers can also contain the hexadecahedral $B_{10}$ group as a pendant group attached to the polymer stem by an ether-like linkage or as part of the polymer chain as in polymers with the recurring unit

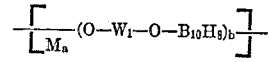

where M, $a$ and $b$ are as defined below and $W_1$ is a divalent organic radical having an ethylene group (substituted or not) attached to the oxygens. For linear polymers the group —O—$W_1$—O— is a divalent organic radical obtained by reacting an epoxide disclosed above containing two epoxide groups (as when one of $Y_1$, $Y_2$, $Y_3$ or $Y_4$ contains an epoxide group) with an acid hydrate of hexadecahedral decaborane according to this invention to open both of the epoxide groups. When the epoxide used contains more than two epoxide groups cross linking will usually result if more than two of the epoxide groups are

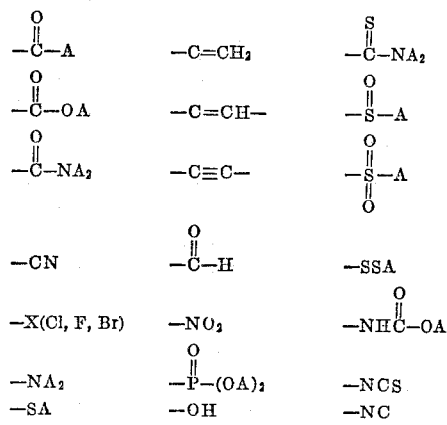

reactive under the conditions used. Stated somewhat differently, W is a divalent organic radical having the formula $$-\underset{t_2}{\overset{t_1}{C}}-W'-\underset{t_4}{\overset{t_3}{C}}-$$

where $t_1$, $t_2$, $t_3$ and $t_4$ are the same or different and can be hydrogen or a monovalent organic radical sufficiently unreactive toward epoxide groups to be capable of existence in the compound

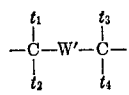

where $t$ represents each of $t_1$, $t_2$, $t_3$ and $t_4$ and W' is any divalent organic radical. Polymers of this type can be prepared by reacting $H_2B_{10}H_{10} \cdot nH_2O$ with a diepoxide in accordance with the present invention.

All of the polymers referred to may have molecular weights comparable to those of conventional and well known polymers. Persons skilled in polymer chemistry are well aware of the reaction conditions which govern polymer formation and size and will have no difficulty in producing in accordance with this invention polymers suitable for particular applications and requiring specific properties in addition to those unique properties contributed by boron.

Other epoxides useful in this invention include the following:

Glycidol

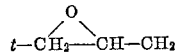

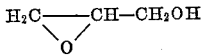

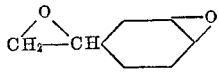

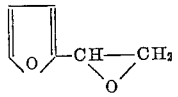

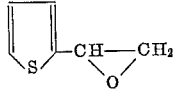

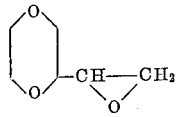

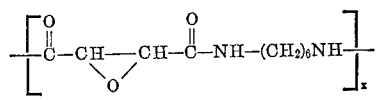

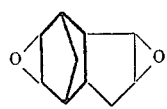

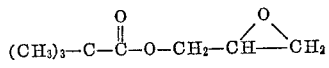

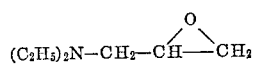

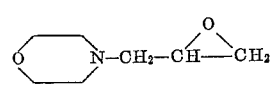

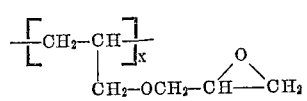

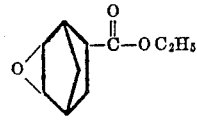

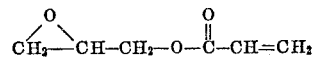

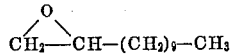

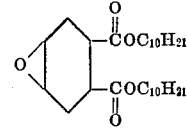

Di-(3,4-epoxy-6-methylcyclohexyl-methyladipate)

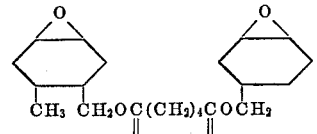

3,4-epoxy-6-methylcyclohexyl-methyl-3,4-epoxy-6-methylcyclohexane carboxylate

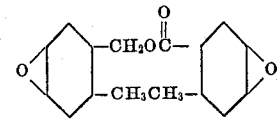

3,4-epoxycyclohexane carbonitrile

Dipentene dioxide (limonene dioxide)

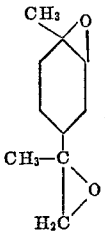

1,2-epoxy-3-phenoxy propane

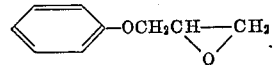

Dipentene monoxide

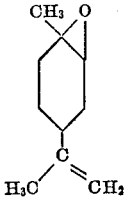

Alpha-pinene oxide

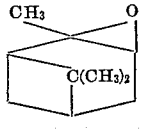

1,2-epoxy-3-allyloxy propane

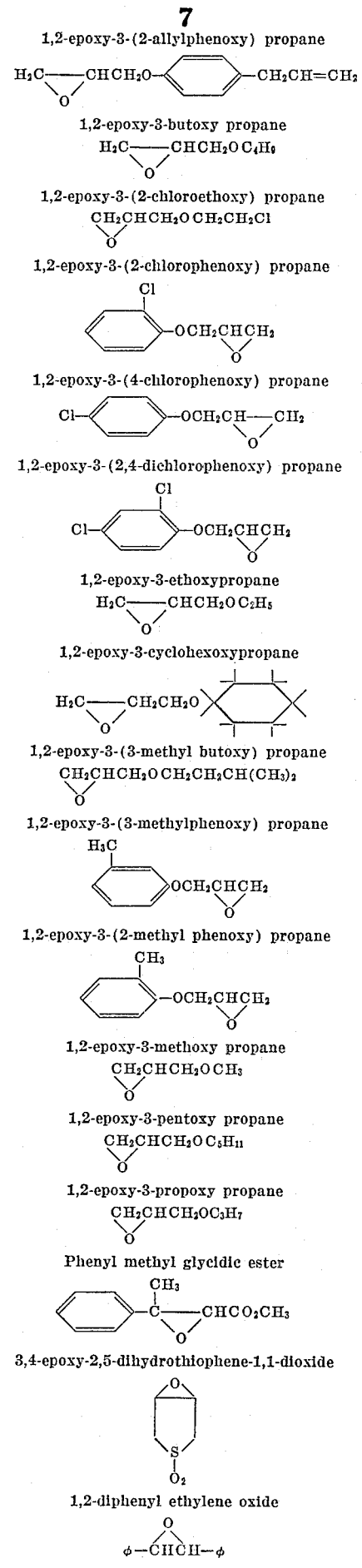

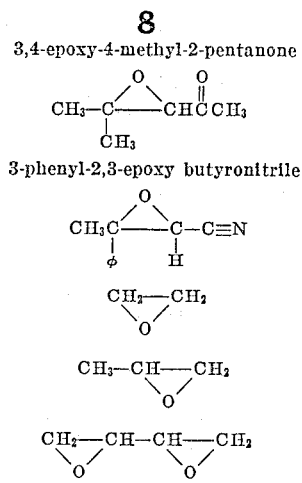

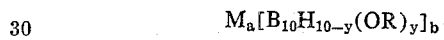

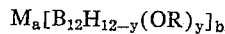

In the above structural formulas $x$ is a whole number, usually a large whole number, signifying the number of recurring structural groups in the formula of a polymer and $\phi$ represents a phenyl group.

Salts of the derivatives of hexadecahedral decaborane produced by the process of this invention can be obtained by adding compounds capable of forming cations in the reaction product mixture or in a solvent miscible with and added to the reaction product mixture. These salts have the structural formula $$M_a[B_{10}H_{10-y}(OR)_y]_b$$

where M is a cation; the $B_{10}$ radical has a hexadecahedral structure; —OR is a monovalent organic substituent connected to a boron atom by an ether-like linkage and corresponding to the epoxide used in the reaction in its saturated form with the epoxy ring opened; $y$ is a whole number preferably from 1 to 4 and $a$ and $b$ are positive whole numbers of 1–3 inclusive, whose values are determined by the valence of M such that $$b = \frac{a}{2}(\text{valence of M})$$

The —OR groups, when more than one is present, can be the same or different. Where R is a polymeric radical the above formula would represent a recurring unit in the polymer.

The corresponding compounds having the formula $$M_a[B_{12}H_{12-y}(OR)_y]_b$$

can be prepared by the same reactions under the same conditions utilizing an acid hydrate of an eicosahedral decaborane. An acid hydrate of an eicosahedral dodecaborane $(H_2B_{12}H_{12} \cdot nH_2O)$ can be prepared by the procedure of U.S. Patent 3,169,044, the disclosure of which is hereby incorporated into this specification.

The boron-containing group $[B_{10}H_{10-y}(OR)_y]^{-2}$ in the above formula is an anion in aqueous solution and behaves as a stable chemical entity in conventional reactions. By varying the amount of epoxide used in the process of preparation, $y$ may be varied from 1 to 4 or more to produce $(B_{10}H_9OR)^{-2}$, $[B_{10}H_8(OR)_2]^{-2}$, $[B_{10}H_7(OR)_3]^{-2}$, $[B_{10}H_6(OR)_4]^{-2}$ and higher substituted hexadecahedral decaborane anions of this type. Since these anions exhibit detergent properties in aqueous solution the compounds containing more than two (OR) groups are difficult to recover. Anions of the general formula are conveniently recovered as their insoluble salts such as the cesium salt $Cs_2B_{10}H_{10-y}(OR)_y$; the preferred compound being the salt $Cs_2B_{10}H_8(OR)_2$.

M can be any cation which forms a salt with the $[B_{10}H_{10-y}(OR)_y]^{-2}$ in the reaction product mixture. Where recovery of the boron derivative is not desired, as when it is going to be used in solution, the M can be any cation which produces a salt of the desired solubility with the anion produced. Exemplary cations include the following: hydronium $(H_3O^+)$, ammonium $(NH_4^+)$, hydrazonium ($NH_2$—$NH_3^+$), N-substituted ammonium, N-substituted hydrazonium, aryldiazonium, pyridinium, quinolinium, sulfonium, phosphonium, metal amine, lithium, sodium, cesium, beryllium, barium, lanthanum, zirconium, vanadium, manganese, iron, cobalt, copper, zinc, mercury, aluminum, thallium, tin, lead, antimony; bismuth, silver or any other metal, $ANH_3^+$, $A_2NH_2^+$, $A_3NH^+$, $A_4N^+$, $(ANHNH_3)^+$, $(A_2N—NH_3)^+$, $A_3S^+$ or $A_4P^+$, where A is an organic radical bonded to the nitrogen, sulfur or phosphorus. The A groups are not critical features of these cation groups. Substituents represented by A can be open-chain or closed-chain, saturated or unsaturated, or the groups can be composed of heterocyclic rings of which the nitrogen, sulfur or phosphorus is a component, e.g., pyridine, quinoline, morpholine, hexamethyleneimine and the like. Preferably A, for reasons of availability of reactants, represents a hydrocarbon group of up to about 18 carbons.

The group M can be a Werner-type coordination complex, e.g., a metal amine such as $[Ni(NH_3)_6]^{+2}$, $([Zn(NH)_3)]^{+2}$, $[Co(NH_2H_4NH_2)_3]^{+2}$, $[Co(NH_3)_6]^{+3}$ and the like.

The products of this invention may be used in situ or may be recovered and purified by any convenient means. Crystallization from aqueous ethanol solutions is usually effective. For products of limited stability, solutions of the products can be treated with adsorptive agents, e.g., activated charcoal or silica gel to adsorb the major portion of the impurities.

To obtain compounds of this invention having two or more —OR groups which are unlike, the acid hydrate is reacted with one epoxide until the desired number of substituents are introduced and the partially substituted product is then reacted with a second epoxide. The intermediate partially substituted product can, if desired, be isolated prior to reaction with the second epoxide. The process can be repeated with a third epoxide or even further. Further modification of various substituent groups can be accomplished by conventional methods to obtain compounds having a broad range of OR groups.

Salts produced by the process of this invention are usually solids, many of which dissolve in water. They vary in stability depending on the substituents and certain nitro and nitroso containing compounds are sensitive to shock and should be kept moist while handling. Others, including the halogen-substituted products and hydrocarbon-substituted products, are stable and can be stored for long periods without extraordinary care.

The process of this invention provides a unique method for introducing a hexadecahedral decaborane with its attendant properties into polymers. As pointed out above, this is accomplished by utilizing epoxides having polymers forming functional groups or other groups convertible into such polymer forming groups. The process is also useful for introducing hexadecahedral decaborane into a wide variety of other compounds for applications where a high boron content is desirable. Many of the compounds have detergent properties and some are colored permitting their use as pigments or dyes. The decaborane of the products of this invention possess an aromatic character and undergoes reactions in a manner resembling benzene, that is, it will react with reagents to add substituents which are capable of bonding to a carbon of an aromatic nucleus such as benzene, naphthalene, toluene, etc. Thus, compounds or anions produced by this invention and in which the decaborane's hydrogen atoms are not completely replaced by OR groups, can be reacted with the numerous reagents suitable for reaction with an aromatic compound to produce a large variety of compounds.

The process of this invention and products produced thereby are illustrated in the following examples. Preparation of an acid hydrate of hexadecahedral decaborane from commercially available cup shaped decaborane ($B_{10}H_{14}$) is shown in Example 1.

EXAMPLE 1

A. Preparation of a decaboryl bis(dialkyl sulfide)

A reaction vessel having a capacity of about 365 g. of water is charged with 0.79 g. of cup shaped decaborane, cooled in liquid nitrogen, and then evacuated to a pressure of 10 microns of mercury. Approximately 21 g. of methyl sulfide is condensed onto the decaborane in the reaction vessel. The reaction vessel is closed, allowed to warm to room temperature and stand for 4 days. During this time, 6.6 millimoles of hydrogen is evolved. The reaction vessel is opened and excess methyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decaborane(10).

The above procedure is equally operable with other organic sulfides.

B. Preparation of $M_2B_{10}H_{10}$ (where M is $NH_4$)

Bis(dimethyl sulfide)decaborane(10) (8.5 g.) is mixed with 50 ml. of liquid ammonia and stirred in a round-bottom reaction vessel for one hour with the vessel being cooled to a temperature of about $-50°$ C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of diammonium hexadecahedral decaborane $(NH_4)_2B_{10}H_{10}$.

C. Preparation of $H_2B_{10}H_{10} \cdot nH_2O$

A solution of $(NH_4)_2B_{10}H_{10}$ obtained in part B in 30 ml. of water is passed through a 0.5 inch diameter chromatography column containing 80 ml. of a commercial acidic ion exchange resin ("Amberlite IR 120–H"). The water effluent is clear, colorless and acidic. The column is rinsed with more water until the effluent is no longer acidic and the water fractions are combined. Evaporation of the combined aqueous solutions under reduced pressure (1 mm. of mercury) at a temperature of about 40° C. leaves a yellow viscous liquid which is the acid hydrate of hexadecahedral decaborane ($H_2B_{10}H_{10} \cdot nH_2O$).

EXAMPLE 2

A solution of 2.0 g. (0.013 mole) of diammonium hexadecahedral decaborane in 10 ml. of water is passed through an Amberlite IR 120–H ion exchange column to produce the acid hydrate ($H_2B_{10}H_{10} \cdot nH_2O$). Water is evaporated in vacuum at 25° C. and the oily residue dissolved in 20 ml. of glyme. A solution of 2.4 g. (0.026 mole) of epichlorohydrin in 10 ml. of glyme is added dropwise. The instantaneous reaction is cooled in an ice bath. The solvent is evaporated in vacuum and the residue dissolved in ethanol. Addition of 3.9 g. (0.026 mole) of CsF dissolved in 10 ml. of glyme results in the formation of a light yellow precipitate.

Analysis shows that one molecule of solvent has also reacted to give $Cs_2B_{10}H_8(OCH_2CH_2CH_2Cl)$

($OCH_2CHOCH_3$)

in which the $B_{10}$ has a hexadecahedral structure.

Calc'd: C, 13.8; H, 4.06; B, 20.9; Cl, 6.8. Found: C, 13.13; H, 4.03; B, 22.01; Cl, 4.03.

EXAMPLE 3

To a solution of the acid hydrate of hexadecahedral decaborane in glyme prepared in Example 1 about 3.1 g. (0.026 mole) of styrene oxide is added while cooling in an ice bath. The reaction is practically instantaneous at 37° C. The solvent is evaporated in vacuum to give a dark brown gum. This residue is dissolved in 20 ml. of ethanol and 3.9 g. (0.026 mole) of CsF dissolved in ethanol is added. A light grey precipitate results. The precipitate is recrystallized from an ethanol-water mixture. Elemental and infrared analyses show the compound to be

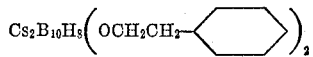

in which the $B_{10}$ has a hexadecahedral structure.

Calc'd: C, 30.78; H, 4.17; B, 17.32. Found: C, 29.32; H, 4.36; B, 18.14.

EXAMPLE 4

A solution of 2.1 g. (0.013 mole) of dicyclopentadiene dioxide dissolved in 10 ml. of glyme is added dropwise to a 20 ml. solution of the acid hydrate of hexadecahedral decaborane in ethyleneglycoldimethylether prepared as in Example 1. The solution becomes hot (glyme reflux) and an orange color develops. The solution is then allowed to cool to room temperature and the solvent is evaporated at reduced pressure. The residual tar is dissolved in ethanol and a solution of 3.9 g. (0.026 mole) of CsF added. An orange precipitate forms and is isolated. Elemental infrared analyses show the product is

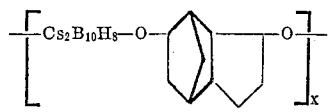

in which the $B_{10}$ has a hexadecahedral structure.

Calc'd: C, 21.80; H, 4.36; B, 19.60. Found: C, 22.54; H, 5.44; B, 19.80.

EXAMPLE 5

This example illustrates the following reaction:

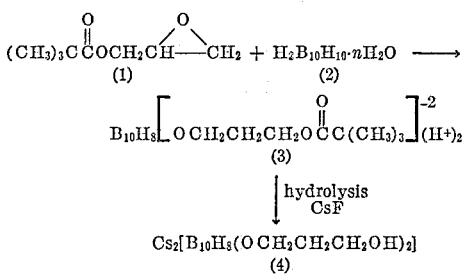

The procedure of Example 3 is followed and the ultimate product anion (4) is recovered by precipitation and identified by elemental and infrared analyses as the cesium salt $Cs_2B_{10}H_8(OCH_2CH_2CH_2OH)$ in which the $B_{10}$ has a hexadecahedral structure.

Calc'd: C, 7.87; H, 3.5; B, 23.5. Found: C, 7.70; H, 3.27; B, 18.48.

EXAMPLE 6

The following reaction is carried out:

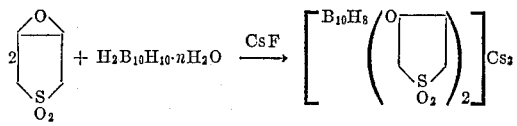

A solution of 15.4 g. (0.10 mole) of $(NH_4)_2B_{10}H_{10}$ (as produced in Example 1B) in 40 ml. of water is passed through an Amberlite IR 120–H ion exchange column to produce the acid hydrate of hexadecahedral decaborane $H_2B_{10}H_{10} \cdot nH_2O$. Water is evaporated from the $$H_2B_{10}H_{10} \cdot nH_2O$$

solution in vacuum at 20° C. to give a residue of about 20 ml. volume. The acid residue is dissolved in 60 ml. of glyme and 26.8 g. (0.20 mole) of 3,4-epoxy-2,5-dihydrothiophene-1,1-dioxide added dropwise.

The glyme is evaporated in vacuum and the residue dissolved in 60 ml. of ethanol. A solution of 30.4 g. (0.20 mole) of cesium fluoride in 60 ml. of ethanol is added to precipitate

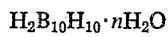

in which the $B_{10}$ has a hexadecahedral structure. The product is recrystallized from an ethanol-water mixture.

EXAMPLE 7

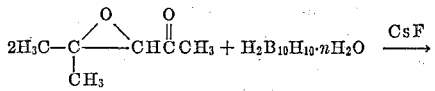

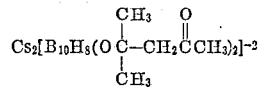

A solution of 15.4 g. (0.10 mole) of $(NH_4)_2B_{10}H_{10}$ as produced in Example 1B in 40 ml. of water is passed through an Amberlite IR 120–H ion exchange column to produce the acid hydrate $H_2B_{10}H_{10} \cdot nH_2O$. Water is evaporated from the $H_2B_{10}H_{10} \cdot nH_2O$ solution in vacuum at 20° C. to give a residue of about 20 ml. volume. The acid residue is dissolved in 60 ml. of glyme and 22.8 g. (0.20 mole) of 3,4-epoxy-4-methyl-2-pentanone added dropwise. The glyme is evaporated in vacuum and the residue dissolved in 60 ml. of ethanol. A solution of 30.4 g. (0.20 mole) of cesium fluoride in 60 ml. of ethanol is added to precipitate

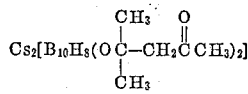

in which the $B_{10}$ has a hexadecahedral structure. The product is recrystallized from an ethanol-water mixture.

EXAMPLE 8

This example illustrates the reaction of a polymeric epoxide with decahydrodecaborate acid hydrate.

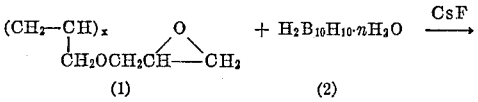

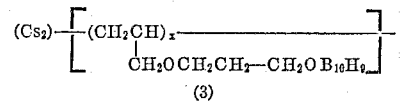

The procedure of Example 3 is followed to produce the product (3) shown. By increasing the quantity of (1) there is produced:

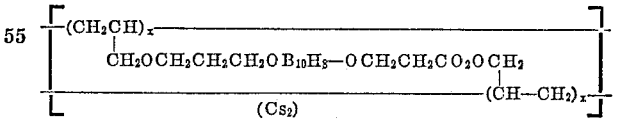

which was characterized by elemental and infrared analyses to have the structure shown.

Calc'd: C, 23.5; H, 4.9; B, 17.6. Found: C, 23.13; H, 5.3; B, 16.2.

EXAMPLE 9

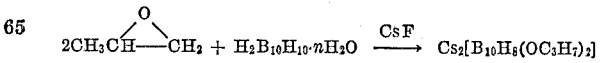

The reaction is conducted according to the procedure of Example 3 in glyme at a temperature of 30° C. and the product recovered as its cesium salt. Direction of opening of the epoxide ring was shown to occur at both the 1 and 2 position by hydrolysis of

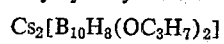

and identification of both n-propyl and isopropyl alcohol as derivatives.

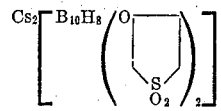

EXAMPLE 10

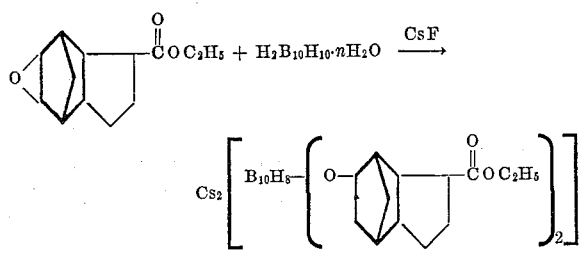

The procedure of Example 3 is followed at a temperature of 30° C. in glyme. The product is precipitated and recovered as its cesium salt.

EXAMPLE 11

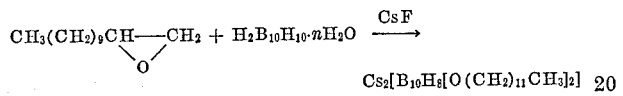

The reaction was carried out in methyl cyanide according to the procedure of Example 3 at a temperature of 55° C. and the product anion precipitated and recovered as its cesium salt.

Calc'd: C, 30.78; H, 4.17; B, 17.32. Found: C, 29.32; H, 4.36; B, 18.14.

EXAMPLE 12

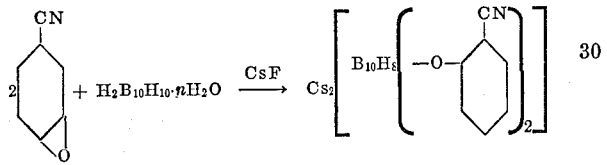

A solution of 15.4 g. (0.10 mole) of $(NH_4)_2B_{10}H_{10}$ (as produced in Example 1B) in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ solution in vacuum at a temperature of less than 20° C. to give a residue of about 20 ml. volume. The acid residue is dissolved in 60 ml. of glyme and 24.6 g. (0.20 mole) of 3,4-epoxycyclohexane carbonitrile added dropwise at less than 30° C. Glyme is evaporated in vacuum and the residue dissolved in 60 ml. of ethanol. A solution of 30.4 g. (0.20 mole) of cesium fluoride in 60 ml. of ethanol is added to precipitate

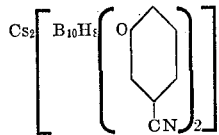

in which the $B_{10}$ has a hexadecahedral structure. The product is recrystallized from an ethanol-water mixture.

EXAMPLE 13

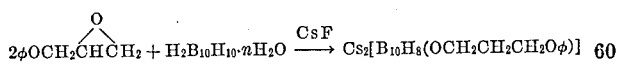

A solution of 15.4 g. (0.10 mole) of $(NH_4)_2B_{10}H_{10}$ as produced in Example 1B in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ solution in vacuum at a temperature of less than 20° C. to give a residue of about 20 ml. volume. The acid residue is dissolved in 60 ml. of glyme and 30.0 g. (0.20 mole) of 1,2-epoxy-3-phenoxypropane added dropwise at less than 30° C. Glyme is evaporated in vacuum and the residue dissolved in 60 ml. of ethanol. A solution of 30 g. (0.20 mole) of cesium fluoride in 60 ml. of ethanol is added to precipitate $Cs_2[B_{10}H_8(OCH_2CH_2CH_2O\phi)_2]$ in which the $B_{10}$ has a hexadecahedral structure. The product is recrystallized from ethanol-water mixture.

EXAMPLE 14

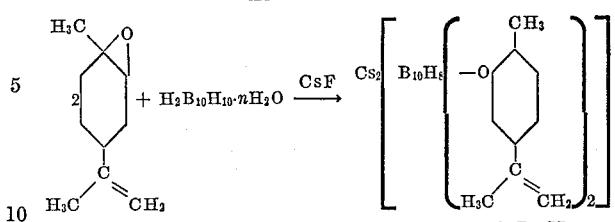

A solution of 15.4 g. (0.10 mole) of $(NH_4)_2B_{10}H_{10}$ as produced in Example 1B in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ (solution) in vacuum at a temperature of less than 20° C. to give a residue of about 20 ml. volume. The acid residue is dissolved in 60 ml. of glyme and 30.4 g. (0.20 mole) of dipentene monoxide added dropwise at less than 0° C. Glyme is evaporated in vacuum and the residue dissolve in 60 ml. of ethanol. A solution of 30.4 g. (0.20 mole) of cesium fluoride in 60 ml. of ethanol is added to precipitate

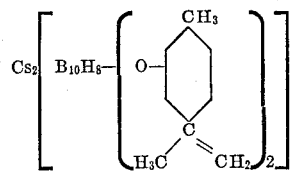

in which the $B_{10}$ has a hexadecahedral structure. The product is not recrystallized.

EXAMPLE 15

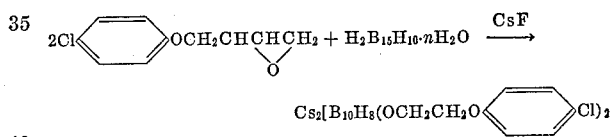

A solution of 15.4 g. (0.10 mole) of $(NH_4)_2B_{10}H_{10}$ as produced in Example 1B in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ (solution) in vacuum at 20° C. to give a residue of about 20 ml. volume. The acid residue is dissolved in 60 ml. of glyme and 33.6 g. (0.20 mole) of 1,2-epoxy-3-(4-chlorophenoxy)propane added dropwise. The glyme is evaporated in vacuum and the residue dissolved in 60 ml. of ethanol. A solution of 30.4 g. (0.2 mole) of cesium fluoride in 60 ml. of ethanol is added to precipitate

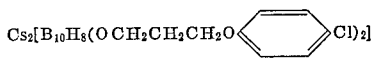

in which the $B_{10}$ has a hexadecahedral structure.

EXAMPLE 16

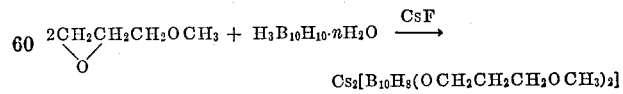

A solution of 15.4 g. (0.10 mole) of $(NH_4)_2B_{10}H_{10}$ as produced in Example 1B in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ solution in vacuum at 20° C. to give a residue of about 20 ml. volume. The acid residue is dissolved in 60 ml. of glyme and 17.6 g. (0.20 mole) of 1,2-epoxy-3-methoxypropane added dropwise. The glyme is evaporated in vacuum and the residue dissolved in 60 ml. of ethanol. A solution of 30.4 g. (0.20 mole) of cesium fluoride in 60 ml. of ethanol is added to precipitate $Cs_2[B_{10}H_8(OCH_2CH_2CH_2OCH_3)_2]$ in which the $B_{10}$ has a hexadecahedral structure.

EXAMPLE 17

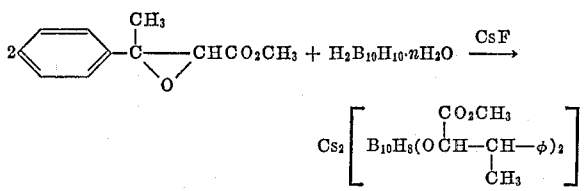

A solution of 15.4 g. (0.10 mole) of $(NH_4)_2B_{10}H_{10}$ as produced in Example 1B in 40 ml. of water is passed through an Amberlite IR 120–H ion-exchange column to produce the acid hydrate $H_2B_{10}H_{10} \cdot nH_2O$. Water is evaporated from the $H_2B_{10}H_{10} \cdot nH_2O$ in vacuum at 20° C. to give a residue of about 20 ml. volume. The acid residue is dissolved in 60 ml. of glyme and 38.4 g. (0.20 mole) of phenylmethylglycidic ester added dropwise. The glyme is evaporated in vacuum and the residue dissolved in 60 ml. of ethanol. A solution of 30.4 g. (0.20 mole) of cesium fluoride in 60 ml. of ethanol is added to precipitate

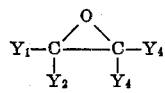

in which the $B_{10}$ has a hexadecahedral structure. The product is recrystallized from an ethanol-water mixture.

What is claimed is:

1. A process for preparing derivatives of hexadecahedral decaborane which comprises contacting an acid hydrate of hexadecahedral decaborane having the formula $H_2B_{10}H_{10} \cdot nH_2O$ with an epoxide having the structural formula,

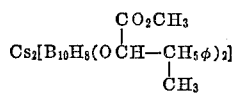

in which $Y_1$, $Y_2$, $Y_3$ and $Y_4$ are individually selected from the group of hydrogen and a monovalent radical such that the epoxide is one which is capable of reacting with benzene in the presence of an aluminum chloride catalyst at a temperature of less than 100° C.

2. The process of claim 1 in which the reaction is carried out in an aqueous solution of the acid hydrate of hexadecahedral decaborane.

3. The process of claim 2 in which at least one of $Y_1$ and $Y_4$ is an organic radical with a functional group selected from the group of

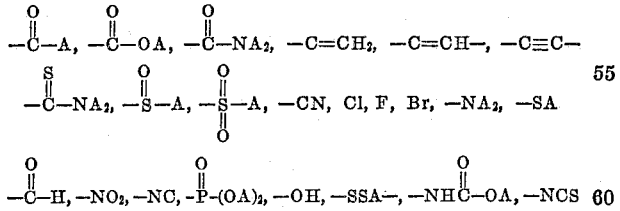

wherein A is a monovalent organic radical of up to about 15 carbon atoms.

4. The process of claim 2 in which $Y_1$ is a monovalent polymeric radical having the structural formula,

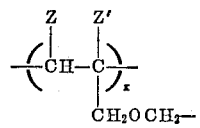

wherein: Z and Z' are individually selected from the group consisting of hydrogen, cyano, carboxylic, hydroxyl, halogen, $C_1$ to $C_{14}$ alkyl, $C_2$ to $C_{14}$ alkenyl and $C_6$ to $C_{14}$ aryl; and $x$ is a large whole number.

5. The process of claim 4 in which $Y_1$ is a monovalent radical of a condensation polymer.

6. The process of claim 4 in which $Y_1$ is a monovalent radical of an addition polymer.

7. The process of claim 1 in which the epoxide is styrene oxide.

8. The process of claim 1 wherein the epoxide is ethylene oxide.

9. The process of claim 1 wherein the epoxide is propylene oxide.

10. The process of claim 1 wherein the epoxide is dicyclopentadiene dioxide.

11. A linear synthetic organic addition polymer characterized by the recurring structural unit,

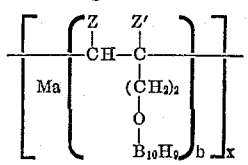

wherein: Z and Z' are individually selected from the group consisting of hydrogen, cyano, carboxylic, hydroxyl, halogen, $C_1$ to $C_{14}$ alkyl, $C_2$ to $C_{14}$ alkenyl and $C_6$ to $C_{14}$ aryl; the $B_{10}$ radical has a hexadecahedral structure; M is a cation which forms a salt with the radical $$[B_{10}H_{10-y}(OR)_y]^{-2}$$

$a$ and $b$ are whole numbers of 1–3 inclusive whose values are determined by the valence of M and $x$ is a whole number.

12. A linear synthetic organic condensation polymer characterized by the recurring structural unit

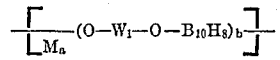

where M is a cation which forms a salt with the radical $[B_{10}H_{10-y}(OR)_y]$ and $a$ and $b$ are whole numbers whose values are determined by the valence of M, the $B_{10}$ radical has a hexadecahedral structure, $W_1$ is a divalent organic radical with terminal carbon atoms and contains up to about 18 carbon atoms.

References Cited
UNITED STATES PATENTS 3,040,010   5/1962   Shokel et al. _____ 260—2
3,093,660   6/1963   Aftandilian et al. _____ 260—2

WILLIAM H. SHORT, *Primary Examiner.*

T. PERTILLA, *Assistant Examiner.*

UNITED STATES PATENT OFFICE
CERTIFICATE OF CORRECTION

Patent No. 3,395,171                                      July 30, 1968

William C. Drinkard, Jr.

It is certified that error appears in the above identified patent and that said Letters Patent are hereby corrected as shown below:

Column 15, lines 36 to 39, the formula should appear as shown below:

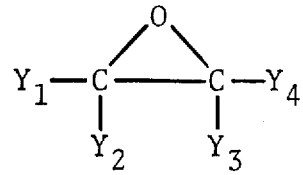

Signed and sealed this 3rd day of February 1970.

(SEAL)
Attest:

Edward M. Fletcher, Jr.                        WILLIAM E. SCHUYLER, JR.
Attesting Officer                                  Commissioner of Patents